United States Patent
Yi et al.

(10) Patent No.: US 10,496,769 B2
(45) Date of Patent: Dec. 3, 2019

(54) SIMULATION OF ROTOR-STATOR FLOW INTERACTION

(71) Applicant: ROLLS-ROYCE plc, London (GB)

(72) Inventors: Junsok Yi, Oxford (GB); Li He, Oxford (GB); Paolo Adami, Derby (GB)

(73) Assignee: ROLLS-ROYCE plc, London (GB)

( * ) Notice: Subject to any disclaimer, the term of this patent is extended or adjusted under 35 U.S.C. 154(b) by 395 days.

(21) Appl. No.: 15/268,359

(22) Filed: Sep. 16, 2016

(65) Prior Publication Data

US 2017/0091354 A1 Mar. 30, 2017

(30) Foreign Application Priority Data

Sep. 29, 2015 (GB) .................................. 1517187.9

(51) Int. Cl.
*G06F 17/50* (2006.01)

(52) U.S. Cl.
CPC .............................. *G06F 17/5009* (2013.01)

(58) Field of Classification Search
CPC ............. G06F 17/5009; G06F 17/5018; G06F 2217/16
USPC .................................................. 703/1, 2, 7, 9
See application file for complete search history.

(56) References Cited

U.S. PATENT DOCUMENTS

| | | | | |
|---|---|---|---|---|
| 8,200,459 B2 * | 6/2012 | de Pablo Fouce | ........................... | G06F 17/5018 703/2 |
| 8,775,140 B2 * | 7/2014 | Yu | ........................... | G06F 17/13 703/2 |
| 2004/0076519 A1 * | 4/2004 | Halfmann | ................. | B22C 9/04 416/97 R |
| 2007/0150231 A1 | 6/2007 | Yang et al. | | |
| 2008/0148564 A1 * | 6/2008 | Burton | .................... | F01D 5/141 29/888.02 |
| 2008/0234988 A1 | 9/2008 | Chen et al. | | |
| 2009/0110561 A1 * | 4/2009 | Ramerth | ................. | F01D 5/082 416/96 R |
| 2010/0312535 A1 | 12/2010 | Chen et al. | | |
| 2011/0299979 A1 * | 12/2011 | Montgomery | .......... | F01D 5/143 415/182.1 |

OTHER PUBLICATIONS

Ansys, "ANSYS CFX Reference Guide Release 15.0", Nov. 30, 2013, (Nov. 30, 2013), ANSYS Inc, XP055341271, pp. 1-386.*

Schlüter et al., "Large-scale integrated LES-RANS simulations of a gas turbine engine," Center for Turbulence Research Annual Research Briefs 2005, Dec. 31, 2005, pp. 111-120.

(Continued)

*Primary Examiner* — Juan C Ochoa
(74) *Attorney, Agent, or Firm* — Oliff PLC

(57) ABSTRACT

A computer-based method of simulating rotor-stator unsteady turbulent flow interaction in turbomachinery, which includes performing CFD ensemble-averaged flow field simulation over the coarse mesh and performing CFD large eddy simulations over the fine meshes, the ensemble-averaged and large eddy simulations being coupled to each other, and the large eddy simulations of the regions of the selected blade passages being used to derive unsteady turbulence stress terms in the ensemble-averaged simulation for corresponding regions of the blade passages of the first and second rows without fine meshes.

11 Claims, 5 Drawing Sheets

(56) References Cited

OTHER PUBLICATIONS

Ansys Inc: "ANSYS CFX Reference Guide Release 15.0," Nov. 30, 2013, ANSYS Inc., pp. 91-158.
Frölich et al., "Hybrid LES/RANS methods for the simulation of turbulent flows," Progress in Aerospace Sciences, 2008, vol. 44, pp. 349-377.
Feb. 1, 2017 Search Report issued in European Patent Application No. 16 18 9119.
Tucker et al., "Hybrid LES Approach for Practical Turbomachinery Flows—Part I: Hierarchy and Example Simulations," Journal of Turbomachinery, Mar. 2012, vol. 134, pp. 021023-1-021023-10.
Rodebaugh et al., "Assessment of Large Eddy Simulation Predictive Capability for Compound Angle Round Film Holes," Proceedings of ASME Turbo Expo 2015: Turbine Technical Conference and Exposition, GT2015-43602, 2015, V05BT12A040-1-V05BT12A040-12.
Rao et al., "Large eddy simulations in low-pressure turbines: Effect of wakes at elevated free-stream turbulence," International Journal of Heat and Fluid Flow, 2013, vol. 43, pp. 85-95.
Yi et al., "Space-Time Gradient Method for Unsteady Bladerow Interaction—Part I: Basic Methodology and Verification," Proceedings of ASME Turbo Expo 2015: Turbine Technical Conference and Exposition, GT2015-43152, 2015, pp. 1-15.
He, L., "Harmonic Solution of Unsteady Flow Around Blades with Separation," AIAA Journal, Jun. 2008, vol. 46, No. 6, pp. 1299-1307.
He, L., "Block-spectral mapping for multi-scale solution," Journal of Computational Physics, 2013, vol. 250, pp. 13-26.
Madavan, N.K., "Unsteady Turbomachinery Flow Simulations on Massively Parallel Architectures," Computing Systems in Engineering, 1992, vol. 3, Nos. 1-4, pp. 241-249.
Mar. 4, 2016 Search Report issued in British Patent Application No. 1517187.9.
Schlüter et al., "Outflow Conditions for Integrated Large Eddy Simulation/Reynolds-Averaged NavierStokes Simulations," AIAA Journal, 2005, vol. 43, No. 1, pp. 156-164.

* cited by examiner

Composite = Deterministic + Nondeterministic

| 1, 3 | 2, 3 | 3, 3 |
| --- | --- | --- |
| 1, 2 | 2, 2 | 3, 2 |
| 1, 1 | 2, 1 | 3, 1 |

(a) (b) (c)

Direct Unsteady solution  Direct Unsteady solution  Present Multi-scale solution
*(instantaneous)*  *(Ensemble averaged)*

(a) (b) (c)

Direct Unsteady solution  Direct Unsteady solution  Present Multi-scale solution
*(instantaneous)*  *(Ensemble averaged)*

SIMULATION OF ROTOR-STATOR FLOW INTERACTION

FIELD OF THE INVENTION

The present invention relates to simulation of rotor-stator unsteady turbulent flow interaction in turbomachinery.

BACKGROUND

There is a continuing pressure to develop gas turbine engines having higher efficiencies, lower fuel burns, lower emissions and lower costs. As such, higher accuracy and consistency in the design of aerofoil blades are sought.

Flow in turbomachinery is inherently unsteady due to relative motion between a stationary blade row (stator) and a rotating blade row (rotor). The relevant components in the gas turbine engine include fans, compressors and turbines of various pressure ratios.

Computational fluid dynamics (CFD) has become an indispensable tool in blading design. However, a major source of uncertainty in CFD results follows from the treatment of turbulent flow. In the context of blade design applications, conventional CFD methods may use empirical turbulence models. While these models can be reasonably well-behaved for certain cases, e.g. in flow at a near design condition, there are also examples where the models struggle to produce adequately accurate and consistent results. In particular, compressor/fan off-design conditions, high pressure turbine heat transfer and cooling on blade surfaces in general, trailing edge and rotor tip regions, and transitional flow associated with loss generation for low pressure turbine blades.

Recent developments in computer hardware and numerical methods in CFD have led in the research arena to the emergence of turbulence eddy resolved methods. For example, large eddy simulations (LES) are a promising approach. These are described in Tucker, P. G. et al, *Hybrid LES approach for practical turbomachinery flows—Part I: Hierarchy and example simulation*, Journal of Turbomachinery, July 2012 in the context of stationary cascade configurations, and in Rodebaugh, G., Stratton, Z., Laskowski, G., and Benson, M, *Assessment of Large Eddy Simulation Predictive Capability for Compound Angle Round Film Holes*, ASME Paper GT2015-43602 in the context of simplified film cooling configurations with a single or few film cooling holes.

However, in the context of engine design, such LES approaches, which are confined to a single component in an isolated domain and are largely direct extensions of approaches developed for and applied to external flows (e.g. for aircraft wings), would lead to prohibitively high computing requirements. They are also in the main confined to a single blade passage and thus do not include intra blade row interaction effects. An exception is the study described in Rao, V. N., Tucker, P G, Jefferson-Loveday, R. J. and Coull, J. D., *Large eddy simulations in low-pressure turbines: Effect of wakes at elevated free-stream turbulence*, Int J of Heat and Fluid Flow, 2013. This includes some influences from an adjacent blade row for a low pressure turbine passage subject to incoming unsteady wakes simulated by upstream moving cylinders. However, this kind of LES analysis of flows with specified upstream disturbances still excludes mutual interactions between a blade row and its upstream neighbouring row.

SUMMARY

A distinctive feature of turbomachinery flow arises from the inherent periodic unsteadiness due to rotor-stator relative motion. Given the close proximity between rotor and stator rows in practical turbomachinery configurations, a turbulence eddy-resolved unsteady method should preferably capture both large scale periodic unsteadiness as well as small scale turbulence eddies. However, simply extending conventional LES approaches, which only deal with the unsteadiness due to turbulence eddy movements, to simulate such flow interactions, would impose unattractive computational burdens due to the need to cover the much longer physical time scales associated with the large scale unsteadiness.

In addition to time resolution issues, the rotor-stator interaction causes a significant further challenge in terms of the computational domain to be adopted. Realistic rotor-stator blade count ratios can be such that, for rotor-stator stage unsteady calculations, a whole 360° annulus domain (typically 30-70 blade passages) may have to be adopted. Conventional LES approaches confined to a single blade passage are thus unable to capture both turbulence and periodic unsteady disturbances in a realistic turbomachinery configuration.

It would be desirable to provide a simulation approach capable of providing a time resolution which allows the modelling of unsteady disturbances and which can be extended beyond a single blade passage.

Accordingly, in a first aspect the present invention provides a computer-based method of simulating rotor-stator unsteady turbulent flow interaction in turbomachinery, the method including:

providing a relatively coarse CFD mesh that discretizes into cells a domain which encompasses plural neighbouring blade passages of a first circumferential row of aerofoil blades, plural neighbouring blade passages of an adjacent, second circumferential row of aerofoil blades downstream of the first row, and the inter-row space between the first and second rows;

providing relatively fine CFD meshes that discretize into finer cells a selected region of the blade passages of the first row encompassed by the domain, and a selected region of the blade passages of the second row encompassed by the domain, the cells of the fine meshes being embedded within the cells of the coarse mesh; and performing CFD ensemble-averaged flow field simulation over the coarse mesh and performing CFD large eddy simulations over the fine meshes, the ensemble-averaged and large eddy simulations being coupled to each other, and the large eddy simulations of the regions of the selected blade passages being used to derive unsteady turbulence stress terms in the ensemble-averaged simulation for corresponding regions of the blade passages of the first and second rows without fine meshes.

Advantageously, the two-scale approach of the method can significantly speed up LES for turbomachinery applications, while avoiding unrealistic computational burdens. In particular, by providing the fine meshes in regions of selected of blade passages, and then deriving stress terms for corresponding regions of other blade passages, useful simulation results can be obtained without having to perform LES in all blade passages. This allows computing requirements to stay at reasonable levels.

In a second aspect, the present invention provides a computer-based process of designing turbomachinery including: providing a specification for the turbomachinery including defining the geometry of a first circumferential row of aerofoil blades, a second circumferential row of aerofoil blades downstream of the first row, and the inter-row space between the first and second rows; performing the method of the first aspect on the defined geometry for one or more operating conditions of the turbomachinery; and adjusting the specification on the basis of the simulated rotor-stator flow interaction resulting from the performance of the method. The process can be repeated as necessary, for example adjusting the geometry of the aerofoil blades at each repetition in order to arrive at a more optimised specification.

In a third aspect, the present invention provides a method for manufacturing turbomachinery including: performing the process of the second aspect; and producing turbomachinery having the adjusted specification.

Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect. For example, a computer system can be provided for simulating rotor-stator unsteady turbulent flow interaction in turbomachinery the system including: (A) a computer-readable medium or media storing (i) a relatively coarse CFD mesh that discretizes into cells a domain which encompasses plural neighbouring blade passages of a first circumferential row of aerofoil blades, plural neighbouring blade passages of an adjacent, second circumferential row of aerofoil blades downstream of the first row, and the inter-row space between the first and second rows; and (ii) a relatively fine CFD meshes that discretize into finer cells a region of selected of the blade passages of the first row encompassed by the domain, and a region of selected of the blade passages of the second row encompassed by the domain, the cells of the fine meshes being embedded within the cells of the coarse mesh; and (B) one or more processors configured to perform CFD ensemble-averaged flow field simulation over the coarse mesh and perform CFD large eddy simulations over the fine meshes, the ensemble-averaged and large eddy simulations being coupled to each other, and the large eddy simulations of the regions of the selected blade passages being used to derive unsteady turbulence stress terms in the ensemble-averaged simulation for corresponding regions of the blade passages of the first and second rows without fine meshes. The system thus corresponds to the method of the first aspect. The system may further include: a display device for displaying the result of the simulations.

Optional features of the invention will now be set out. These are applicable singly or in any combination with any aspect of the invention.

The domain may be an annular domain that encompasses all of the aerofoil blade passages of the first row, and all of the aerofoil blade passages of the second row. Alternatively, the domain may encompass only a portion of the full angular extent of the turbomachinery.

The selected blade passages of the first row encompassed by the domain may be a single one or may be plural of the encompassed blade passages of the first row. Similarly, the selected blade passages of the second row encompassed by the domain may be a single one or may be plural of the encompassed blade passages of the second row.

The selected blade passages of the first row encompassed by the domain may be no more than one third (and preferably no more than one quarter or one fifth) of the total encompassed blade passages of the first row. Similarly, the selected blade passages of the second row encompassed by the domain are no more than one third (and preferably no more than one quarter or one fifth) of the total encompassed blade passages of the second row.

The region of the selected blade passages of the first row may include a wall portion and/or a wake portion of the respective passages. Similarly, the region of the selected blade passages of the second row may include a wall portion and/or a trailing edge portion of the respective passages.

The unsteady stress terms in the ensemble-averaged simulation for the corresponding regions of the blade passages of the first and second rows without fine meshes may be derived by block spectral mapping from the large eddy simulations of the regions of the selected blade passages.

The turbomachinery may be a gas turbine engine, such as an aero engine.

The method may include displaying the result of the simulations.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
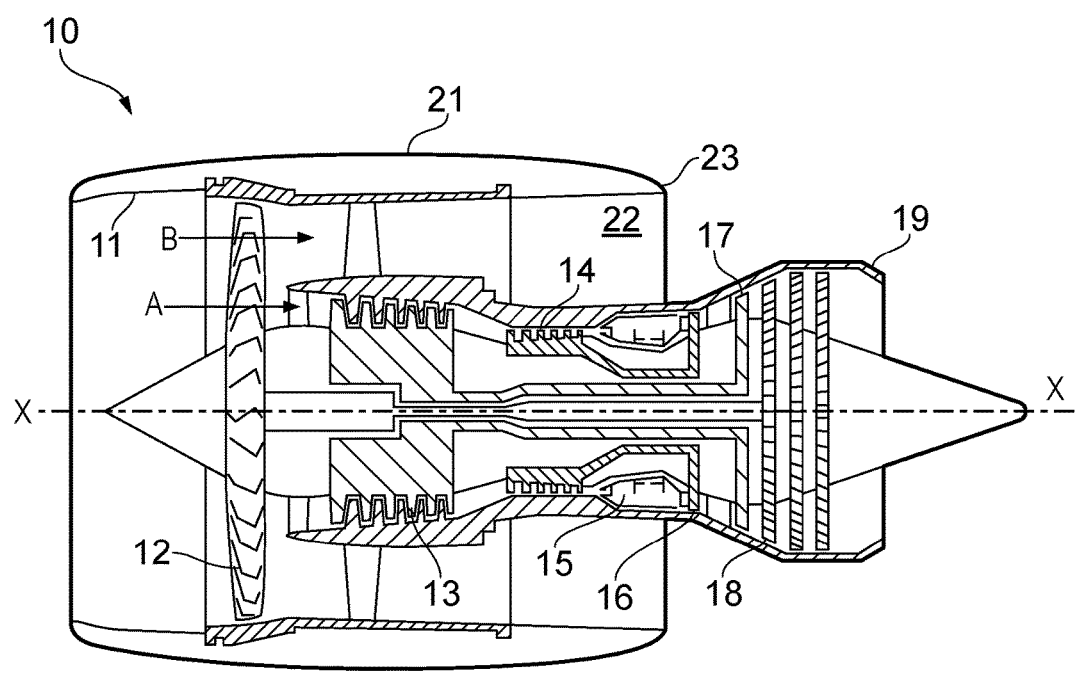
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The present invention relates to a method of simulating unsteady turbulent flows subject to rotor-stator flow interaction in turbomachinery that can be used in the design and manufacture of engines such as that shown in FIG. 1. Advantageously, the method can significantly speed up eddy-resolved LES for turbomachinery applications. In particular, the method adopts a two-scale approach, in which a fine mesh for LES is typically only used in a single blade passage or a small number of passages for each blade row. The approach and steps of the method are described in more detail below.

Flow Decomposition

The general governing equations for unsteady flow (the Navier-Stokes equations) can be expressed in a simple form:

$$\frac{\partial U}{\partial t} + R(U) = 0 \tag{1}$$

where U is the spatial and time dependent flow variable, a vector with 5 elements in a 3-dimensional case. The present two-scale method starts with a split of unsteady flow into two parts:

$$U(x,t) = \hat{U}(x,t) + U'(x,t) \tag{2}$$

A general unsteady disturbance U is split into a deterministic part $\hat{U}$ and a nondeterministic part U'. Here, a deterministic disturbance is defined as the one with its frequency directly linked to blade counts and rotational speed of rotor shaft. The rest of the unsteady disturbance is regarded as nondeterministic. In a turbomachinery context, the deterministic part corresponds to rotor-stator blade row interactions or inlet and exit distortions, while the nondeterministic disturbances are random turbulence or non-synchronised vortex shedding (e.g. from a blade trailing edge) with unknown frequencies. A correspondingly split time signal of a composite turbomachinery flow disturbance is illustrated schematically in FIG. 2.

Clocking-Dependent Ensemble-Averaging

Figure 2:
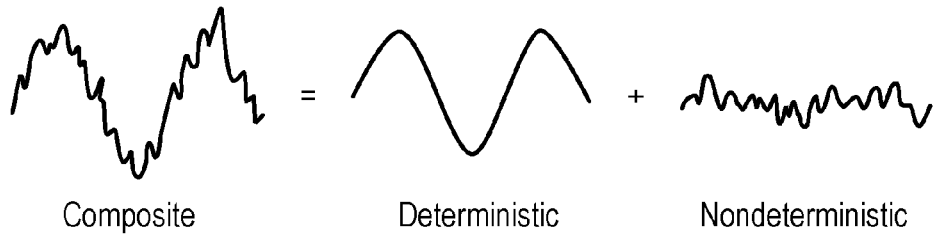
FIG. 2 shows schematically splitting of a composite turbomachinery flow disturbance.
Figure 3:
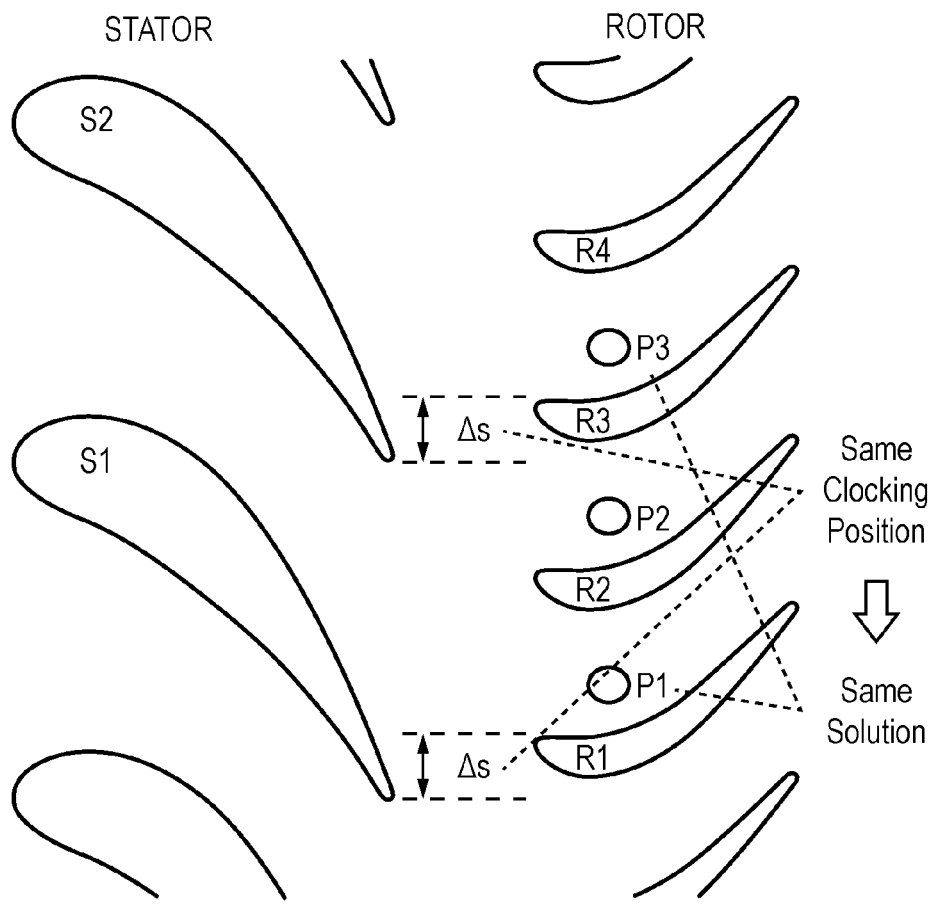
FIG. 3 shows schematically clocking dependence between stator and rotor blades of a turbine stage.

For the flow decomposition as depicted in FIG. 2, an ensemble-averaging is undertaken. It is assumed that a deterministic unsteady flow disturbance due to blade row interaction is uniquely linked to the relative circumferential positioning (so called "clocking") between the blade passage under consideration and those in a relatively moving blade row. This clocking dependence is illustrated in FIG. 3 for a turbine stage (as described by Yi, J. and He, L., *Space-Time Gradient Method for Unsteady Bladerow Interaction—Part 1: Basic Methodology and Verification*, ASME Paper GT2015-43152, 2015). The relative clocking position of rotor blade R3 relative to stator blade S2 is the same as that of blade R1 relative to blade S1. Thus the instantaneous flow of R3 should be the same as that of R1. Hence instantaneous flows at point P1 and P3 are the same, because of the same clocking.

For a given spatial point, an ensemble-average of an unsteady disturbance with a known frequency (time period length $T_p$) is an average of all the sample points in its time trace at the same phase angle of the period:

$$\hat{U}(x,t) = \frac{1}{N} \sum_{n=1}^{N} U(x, t+nT_p) \tag{3}$$

This allows the ensemble averaging of the full signal (Equation (2)) to be determined, $$\hat{U}(x,t) = \hat{U}(x,t) + \overline{U'}(x,t) \tag{4}$$

As expected, when $\hat{\hat{U}}(x, t) = \hat{U}(x, t)$, the ensemble-averaging of the nondeterministic part becomes zero, i.e. $\overline{U'}(x, t) = 0$.

Two-Scale Flow Equations

Figures 4, 5:
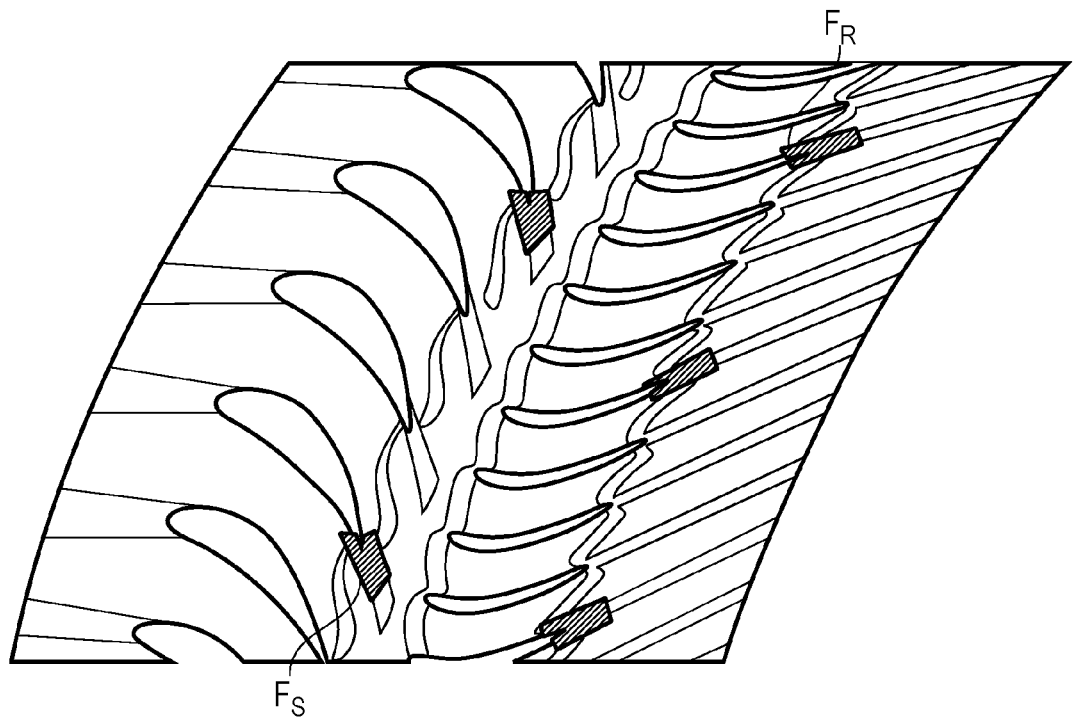
FIG. 4 shows an example computational domain for a coarse and fine meshes of a stator-rotor pair.
FIG. 5 shows 3×3 fine mesh cells embedded in a coarse mesh cell.

The approach of the present simulation method is to solve large scale deterministic (blade row interaction induced) unsteady flow disturbances on a global coarse base mesh grid, and to solve small scale nondeterministic (random turbulence) in local embedded fine meshes. FIG. 4 shows an example computational domain of two meshes for a stator-rotor pair. The coarse mesh encompasses plural neighbouring blade passages of the upstream circumferential row of stator blades, plural neighbouring blade passages of the adjacent, downstream row of rotor blades, and the inter-row space between the blade rows. For every third stator blade, a fine mesh $F_S$ is provided which covers a trailing edge passage portion, and for every fourth rotor blade, a further fine mesh $F_R$ is provided which covers a trailing edge passage portion. The fine mesh cells are embedded in the coarse mesh cells, as illustrated in FIG. 5 which shows 3×3 fine mesh cells embedded in a coarse mesh cell.

Embedded fine meshes of the type shown in FIG. 4 exhibit a dual locality. That is, not only are the fine meshes typically embedded only in local wake (and/or near wall) regions, they are also typically located only in selected passages of each blade row. Each of these features helps to reduce the computational burden of the method.

For the coarse mesh flow field, ensemble-averaging the original flow equations (Equation (1)) gives, $$\frac{\partial \hat{U}}{\partial t} + \overline{R(U)} = 0 \tag{5}$$

The second term is a nonlinear flux residual. Nonlinearity of the convective fluxes is at the heart of the turbulence closure and modelling issues. The flux residual can be expressed as the residual calculated using the averaged flow variables and the rest so called "Unsteady Stress Terms" (UST). A similar flux split has been used in seeking a time-averaged state for flows subject to limit-cycle instabilities, see He, L., *Harmonic Solution of Unsteady Flow around Blade with Separation*, AIAA Journal, Vol. 46, No. 6, 2008. The present ensemble-averaged flow thus has the equation in a form:

$$\frac{\partial \hat{U}}{\partial t} + R(\hat{U}) + UST = 0 \tag{6}$$

which allows the ensemble-averaged flow field to be solved on the coarse mesh, once the USTs are known and available for use as a source term.

For the locally embedded fine mesh, the flow decomposition (Equation (2)) is substituted into the original flow equation:

$$\frac{\partial U'}{\partial t} + R(U) + \frac{\partial \hat{U}}{\partial t} = 0 \tag{7}$$

This provides a two-scale coupled system:
Coarse Mesh:

$$\frac{\partial \hat{U}}{\partial t} + R(\hat{U}) = -(UST)_f \tag{8a}$$

Fine Embedded Mesh:

$$\frac{\partial U'}{\partial t} + R(U) = -\left(\frac{\partial \hat{U}}{\partial t}\right)_c \tag{8b}$$

The right hand sides effectively provide the drivers for coupling between the two scales. For the coarse mesh deterministic unsteady flow, the unsteady turbulence stress terms are combined together as a scalar source term for each of the momentum equations and energy equation (subscript "f" denotes that the UST derives from the fine mesh solution). On the other hand, for the fine mesh flow field, the temporal derivative of the coarse base mesh solution provides a source term in balancing the unsteady flow equation ("c" indicates that the temporal gradient term comes from the coarse mesh solution).

Based on the clocking dependence of the deterministic unsteady flow, the coarse mesh equation implies that the USTs also have to be clocking-dependent. This is in keeping with a general assumption of existence of unique turbulence statistics for a given spatial point. As such, the coarse mesh flow equation is solved for a given clocking/phase of the deterministic unsteadiness. Consequently, the unsteady fine mesh flow equation is solved with a clocking/phase at which the temporal gradient term of the coarse mesh $$\left(\frac{\partial \hat{U}}{\partial t}\right)_c$$

is given.

Implementation

For a demonstration of the method, the coupling procedure was implemented in a Navier-Stokes solver (HYDRA). For the solutions on both meshes, explicit 5-step Runge-Kutta time marching in a pseudo time was adopted to drive the discretized equations to convergence. Below we describe more detailed features of the implementation.

Treatment of Temporal Gradients

The physical temporal gradient terms for the two scales were treated differently. For the deterministic unsteadiness due to the blade row interaction, the temporal gradient $$\left(\frac{\partial \hat{U}}{\partial t}\right)$$

is efficiently and accurately determined by a space-time gradient (STG) method described by Yi, J. 2015 ibid. On the other hand, the embedded fine mesh is intended for capturing nondeterministic turbulence eddies. Thus the temporal gradient of the fine mesh solution is approximated either by a $2^{nd}$ order implicit backward difference in the framework of the dual time stepping, or directly obtained using the explicit Runge-Kutta time integration Determination of Unsteady Stress Terms The USTs can be determined from the fine mesh, by the following three steps.

Firstly, the ensemble-averaged flow variables are obtained from the fine mesh time-domain LES solution (Equation 8(b)). A simple on-the-fly average (He, L. 2008 ibid) can be adopted. As the fine mesh solution is stepped forward at time step n, the new averaged value is determined from the new flow variable and the averaged value at the previous time step.

$$\hat{U}_f^n = \frac{n-1}{n} \hat{U}_f^{n-1} + \frac{1}{n} U_f^n \tag{9}$$

Secondly, the flux residual is obtained by using the averaged fine mesh solution. Consider a 2D coarse mesh cell embedded by 3×3 fine mesh cells, as shown in FIG. 5. Ensemble averaging Equation 8(b) for a fine mesh cell ij, (i,j=1, 2, 3) gives:

$$R(\overline{U}_f)_{ij} + (UST)_{ij} = -\left(\frac{\partial \hat{U}}{\partial t}\right)_c \tag{10}$$

Thirdly, the net flux of the coarse cell is the sum of those for the 3×3 fine cells, i.e.

$$R(\hat{U})_c = \Sigma R(\overline{U}_f)_{ij}$$

Consequently, the UST for the coarse mesh cell as required for Equation 8(a) becomes:

$$(UST)_f = -\left(\frac{\partial \hat{U}}{\partial t}\right)_c - \sum R(\overline{U}_f)_{ij} \tag{12}$$

Block Spectral Mapping of Unsteady Stress Terms

As described above, the fines mesh are only embedded in a single blade passage or a very small number of blade passages. A typical composite mesh is shown in FIG. 4, in which local fine mesh regions are embedded around blade trailing edges, but only in a few selected passages.

The USTs generated from the embedded fine mesh regions are mapped to the corresponding regions of the other passages which do not have embedded fine meshes. The passage-to-passage variation of the USTs can be efficiently and accurately accounted for by using a block spectral method, as described in He, L., *Block-Spectral Mapping for Multi-Scale Solution*, Journal of Computational Physics, Vol. 250 (2013), pp 13-26, October 2013.

Coupling Between Two Scale Solutions

The coarse mesh base domain is solved as an unsteady Navier Stokes solution, except where there is an embedded fine mesh and the corresponding USTs are included (Equation 8(a)).

The fine mesh equation are marched forward in the physical time, but with a source term in the form of the ensemble averaged temporal gradient from the coarse base mesh solution.

The boundaries of the embedded fine mesh regions can be taken to be either an outflow boundary, in which the coarse base mesh solution only provides upstream travelling pressure/acoustic disturbance, or a boundary where the nondeterministic unsteady effects are small so that the stress terms are negligible. In these cases, the upwinding biased flux calculations can accommodate outgoing unsteadiness without significant reflections. For cases of an upstream boundary with incoming turbulence, inflow turbulence fluctuations can be generated to allow the time domain eddy-resolved solution on the fine mesh to proceed.

Figure 6:
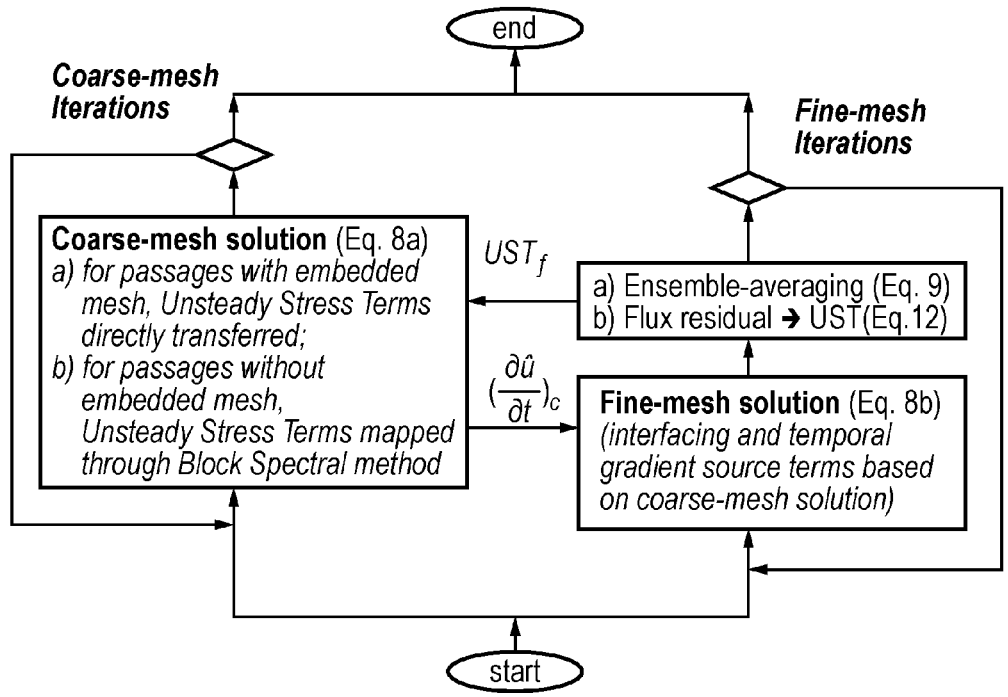
FIG. 6 shows a flow chart of an implementation procedure of a two-scale method for simulating rotor-stator flow interaction.

A flow chart of an implementation procedure of the two-scale method is shown in FIG. 6.

Figure 7:
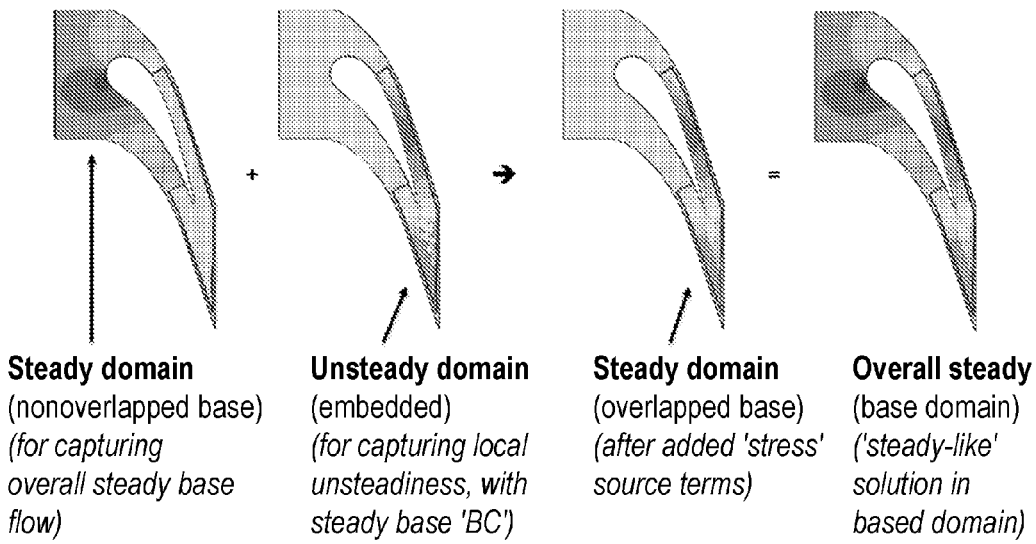
FIG. 7 shows a basic implementation of the two-scale method of FIG. 6 for flow around a turbine blade trailing edge.

The basic implementation of the two-scale method is illustrated in FIG. 7 for flow around a turbine blade trailing edge.

Results

Figure 8:
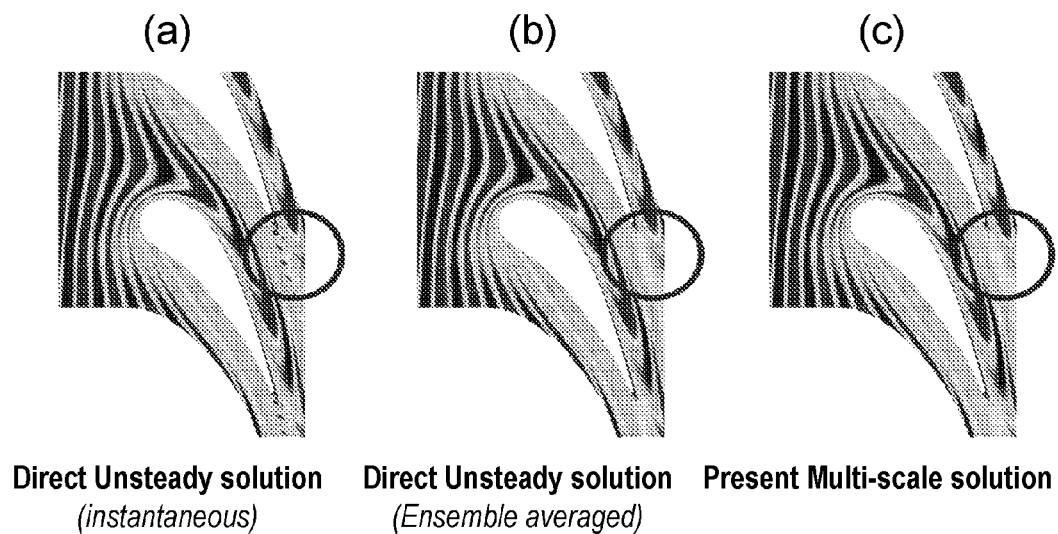
FIG. 8 shows, for a turbine blade subject to incoming unsteady wakes, entropy contours (a) calculated by an instantaneous direct unsteady simulation, (b) an ensemble averaged direct unsteady simulation, and (c) the two-scale method described above.
Figure 9:
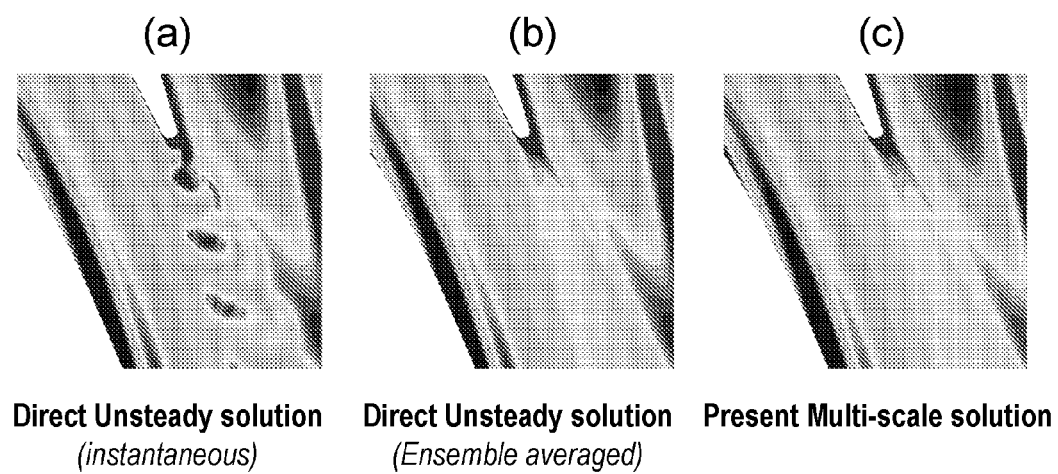
FIG. 9 shows respective details (a) to (c) of the circled regions in FIG. 8.

FIG. 8 shows, for a turbine blade subject to incoming unsteady wakes, entropy contours (a) calculated by an instantaneous direct unsteady simulation, (b) an ensemble averaged direct unsteady simulation, and (c) the two-scale method described above. FIG. 9 shows respective details (a) to (c) of the circled regions in FIG. 8.

The ensemble-averaged entropy contours from the two-scale method compare well with the corresponding direct unsteady solutions, illustrating the validity of the present procedure and implementation Conclusion The results show that it is possible to carry out LES of turbulent flows in multi-row rotor-stator coupled configurations. This is made possible by localising the LES to embedded fine meshes, allowing the LES to be performed on a different time-scale to the ensemble-averaged flow field simulation. The effects of eddy resolved turbulence on a local embedded mesh region in a single blade passage or a few discrete passages can then be mapped to a whole annulus domain with a large number of passages.

The method has particular utility for the design of turbomachinery. For example, the method can be repeated after making adjustments to the specification of the turbomachinery, including e.g. to the geometry of the blades, based on previous simulation results. In this way, an improved turbomachinery specification can be arrived at.

While the invention has been described in conjunction with the exemplary embodiments described above, many equivalent modifications and variations will be apparent to those skilled in the art when given this disclosure. Thus, although described above in relation to aero-engine gas turbines, the method is generally applicable to all types of turbomachinery, e.g. axial, radial, aero-engine, land-based, marine propulsion, gas pumping gas turbines and steam turbines. Accordingly, the exemplary embodiments of the invention set forth above are considered to be illustrative and not limiting. Various changes to the described embodiments may be made without departing from the spirit and scope of the invention.

As used herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

All references referred to above are hereby incorporated by reference.

The invention claimed is:

1. A computer-based method of simulating rotor-stator unsteady turbulent flow interaction in turbomachinery, the method including:

providing a coarse computational fluid dynamics (CFD) mesh that discretizes into cells a domain which encompasses plural neighbouring blade passages of a first circumferential row of aerofoil blades, plural neighbouring blade passages of an adjacent, second circumferential row of aerofoil blades downstream of the first circumferential row, and the inter-row space between the first and second circumferential rows;

providing fine CFD meshes, that are finer than the coarse CFD mesh, that discretize into finer cells a selected region of the blade passages of the first circumferential row encompassed by the domain, and a selected region of the blade passages of the second circumferential row encompassed by the domain, the cells of the fine CFD meshes being embedded within the cells of the coarse CFD mesh; and performing CFD ensemble-averaged flow field simulation over the coarse CFD mesh and performing CFD large eddy simulations over the fine CFD meshes, the CFD ensemble-averaged flow field and CFD large eddy simulations being performed over overlapping areas, and the CFD large eddy simulations of the selected region of the blade passages of the first circumferential row and the selected region of the blade passages of the second circumferential row being used to calculate unsteady turbulence stress terms in the CFD ensemble-averaged flow field simulation for regions of the blade passages of the first and second circumferential rows without fine CFD meshes.

2. A method according to claim 1, wherein the selected region of the blade passages of the first circumferential row encompassed by the domain are no more than one third of the total encompassed neighbouring blade passages of the first circumferential row.

3. A method according to claim 1, wherein the selected region of the blade passages of the second circumferential row encompassed by the domain are no more than one third of the total encompassed neighbouring blade passages of the second circumferential row.

4. A method according to claim 1, wherein the selected region of the blade passages of the first circumferential row includes a wall portion and/or a wake portion of the respective passages.

5. A method according to claim 1, wherein the selected region of the blade passages of the second circumferential row includes a wall portion and/or a trailing edge portion of the respective passages.

6. A method according to claim 1, wherein the unsteady turbulance stress terms in the CFD ensemble-averaged flow field simulation for the corresponding regions of the blade passages of the first and second circumferential rows without fine CFD meshes are derived by block spectral mapping from the CFD large eddy simulations of the selected regions of the blade passages.

7. A method according to claim 1, wherein the turbomachinery is a gas turbine engine.

8. A computer-based process of designing turbomachinery including:

providing a specification for the turbomachinery including defining the geometry of a first circumferential row of aerofoil blades, a second circumferential row of aerofoil blades downstream of the first circumferential row, and the inter-row space between the first and second circumferential rows;

performing the method of claim 1 on the defined geometry of the first circumferential row of aerofoil blades for one or more operating conditions of the turbomachinery; and adjusting the specification on the basis of a simulated rotor-stator flow interaction resulting from the performance of the method.

9. A method for manufacturing turbomachinery including:
performing the process of claim 8; and
producing turbomachinery having the adjusted specification.

10. A non-transitory computer readable medium storing a computer program comprising code which, when run on a computer, causes the computer to perform the method of claim 1.

11. A computer system comprising a processor programmed to perform the method of claim 1.

* * * * *